US011054224B1

(12) United States Patent
Stephens et al.

(10) Patent No.: US 11,054,224 B1
(45) Date of Patent: Jul. 6, 2021

(54) SYSTEM FOR PHYSICALLY CAPTURING AND SIGNAL-DEFEATING UNMANNED AERIAL VEHICLES

(71) Applicant: Government of the United States, as represented by the Secretary of the Air Force, Wright-Patterson AFB, OH (US)

(72) Inventors: Hunter I. Stephens, Hagatna, GU (US); Anthony M. Mountain, West Springfield, MA (US); Kynan M. Valencia, Indianapolis, IN (US); Cory A. Cooper, Monument, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 400 days.

(21) Appl. No.: 16/266,405

(22) Filed: Feb. 4, 2019

Related U.S. Application Data

(60) Provisional application No. 62/626,233, filed on Feb. 5, 2018.

(51) Int. Cl.
*B64F 1/02* (2006.01)
*F41H 11/04* (2006.01)
*H04K 3/00* (2006.01)
*B64C 39/02* (2006.01)

(52) U.S. Cl.
CPC ............ *F41H 11/04* (2013.01); *B64C 39/024* (2013.01); *B64F 1/02* (2013.01); *H04K 3/68* (2013.01); *B64C 2201/12* (2013.01)

(58) Field of Classification Search
CPC .......... F41H 11/04; B64F 1/02; B64C 39/024; B64C 2201/12; H04K 3/68
See application file for complete search history.

(56) References Cited

U.S. PATENT DOCUMENTS

| 4,884,171 A | 11/1989 | Maserang et al. |
| 5,136,119 A | 8/1992 | Leyland |
| 5,525,988 A | 6/1996 | Perkins et al. |
| 5,908,043 A | 6/1999 | Paes et al. |
| 6,065,239 A | 5/2000 | Thomas et al. |

(Continued)

OTHER PUBLICATIONS

Black Hole Faraday Bag, EDEC Digital Forensics, Amazon.com, Accessed Feb. 1, 2018.

(Continued)

*Primary Examiner* — Brian M O'Hara
*Assistant Examiner* — Keith L Dixon
(74) *Attorney, Agent, or Firm* — AFMCLO/JAZ; Timothy M. Barlow (57) ABSTRACT

A system for defeating a threat unmanned aerial vehicle including a friendly unmanned aerial vehicle and a containment system. The containment system is deployable from the friendly unmanned aerial vehicle and includes a signal blocking enclosure and a capturing device. The signal blocking enclosure is formed of a conductive material for shielding radio frequency signals from propagating in or out of the signal blocking enclosure. The capturing device is configured for arresting the threat unmanned aerial vehicle and positioning an arrested threat unmanned aerial vehicle within the signal blocking enclosure.

16 Claims, 4 Drawing Sheets

(56) References Cited

U.S. PATENT DOCUMENTS

| | | |
|---|---|---|
| 6,626,077 B1 | 9/2003 | Gilbert |
| 8,375,837 B2 | 2/2013 | Goossen et al. |
| 8,723,053 B2 | 5/2014 | Winch et al. |
| 9,085,362 B1 | 7/2015 | Kilian et al. |
| 9,527,604 B2 | 12/2016 | Melish et al. |
| 9,862,489 B1 | 1/2018 | Weinstein et al. |
| 9,896,221 B1 | 2/2018 | Kilian et al. |
| 10,005,556 B2 | 6/2018 | Aagaah et al. |
| 10,239,637 B2* | 3/2019 | Ashdown ................ B64F 1/027 |
| 10,435,153 B2* | 10/2019 | Klein ................ F41H 13/0006 |
| 10,759,532 B2* | 9/2020 | Zhang .................. B64C 39/024 |
| 2015/0060129 A1 | 3/2015 | Judy et al. |
| 2016/0023760 A1* | 1/2016 | Goodrich ................ G05D 1/12 |
| | | 244/10 |
| 2017/0253348 A1* | 9/2017 | Ashdown ............ F41H 13/0006 |
| 2017/0356726 A1* | 12/2017 | Theiss .................. B64C 39/024 |
| 2018/0105271 A1 | 4/2018 | Wypyszynski et al. |
| 2018/0245888 A1* | 8/2018 | Banga .................. B64C 39/024 |
| 2019/0100331 A1* | 4/2019 | Wright ..................... B64F 1/22 |

OTHER PUBLICATIONS

Gibbs, Samuel, Drone wars: new UAV interceptor billed as net-firing solution to rogue flying, The Guardian, Jan. 12, 2016.
Goodrich, Marcia, Drone Catcher: "Robotic Falcon" can Capture, Retrieve Renegade Drones, Michigan Technological University, Jan. 31, 2018.
Liberatore, Stacy, Tokyo Police Reveal Bizarre 'UAV drone catcher', Daily Mail, Dec. 11, 2015.
Moseman, Andrew, This Drone Interceptor Captures Your Pathetic Puny Drone With a Net, Popular Mechanics, Feb. 11, 2015.

* cited by examiner

SYSTEM FOR PHYSICALLY CAPTURING AND SIGNAL-DEFEATING UNMANNED AERIAL VEHICLES

CROSS REFERENCE TO RELATED APPLICATION

This application claims priority to U.S. Provisional Application Ser. No. 62/626,233 filed Feb. 5, 2018, entitled "Unmanned Aerial System Neutralization System," the entire contents of which is incorporated herein by reference.

GOVERNMENT INTEREST

The invention described herein may be manufactured, used, and licensed by or for the U.S. Government.

FIELD OF THE INVENTION

The present disclosure relates generally to defeating unmanned aerial vehicles by blocking the signals to/from the unmanned aerial vehicle being defeated. More particularly, the present disclosure relates to a system for physically capturing an unmanned aerial vehicle and enveloping the captured vehicle in a signal blocking enclosure in an aerial deployment environment.

BACKGROUND OF THE INVENTION

An unmanned aerial vehicle ("UAV"), commonly known as a drone, is an aircraft without a human pilot physically located within or on the aircraft. A UAV is a component of an unmanned aerial system ("UAS"), which generally includes one or more UAVs, a ground-based controller, and a system of communications between the UAVs and the ground-based controller. In the past several years, the prevalence and capabilities of UASs has increased rapidly from use by hobbyists for racing purposes, taking video and pictures of landscapes, etc., to use by the U.S. Department of Defense ("DoD") and other military forces to support tactical, operational, and strategic operations. In this regard, the U.S. DoD now categorizes UAVs into five groups, with each category increasing in capability. For example, "Group 1" generally includes UAVs that have a maximum takeoff weight of twenty pounds, that operate at an altitude below 1,200 feet above ground level ("AGL"), and that have a maximum speed of one hundred knots. "Group 2" generally includes UAVs that have a maximum takeoff weight of between twenty-one to fifty-five pounds, that operate at an altitude below 3,500 feet AGL, and that have a maximum speed of less than 250 knots. Groups 3-5 then include UAVs with a higher maximum takeoff weight, ability to operate at higher altitudes, and/or at higher speeds as compared to Group 2 UAVs.

Unfortunately, the use of UASs has quickly turned from recreational and defense purposes to that of malicious intent. For example, the Islamic State in Iraq and Syria ("ISIS") commonly use home-modified and commercial, off-the-shelf UASs (typically Group 1 UAVs) in order to monitor troop movements and for propaganda purposes in the Middle East. More recently, there has been a push by ISIS to weaponize these systems to cause direct harm and loss of life to allied forces. For purposes of the present disclosure, a UAS intended to be weaponized or otherwise used for malicious intent is referred to as a "threat unmanned aerial system" (or "threat UAS"). Similarly, a UAV intended to be weaponized or otherwise used for malicious intent is referred to as a "threat unmanned aerial vehicle" (or "threat UAV").

To defeat threat UAVs, systems have been developed that focus on arresting/immobilizing a threat UAV by entangling the threat UAV in a net. For example, systems have been developed for arresting/immobilizing threat UAVs using a ground- or air-based net launching system to entangle a threat UAV. While these systems are somewhat effective for physically defeating threat UAVs, launch systems have several limitations and disadvantages such as the deployment mechanisms for launching the net being largely line of sight and the difficulty in arresting the threat UAV without missing. Thus, multiple attempts are often needed, resulting in additional time and complexity needed for re-loads to the launching system. Net launching systems also have the disadvantage of an inability to control the flight of an arrested threat UAV to a safe/remote location when needed, such as when the threat UAV is carrying a malicious payload. Further, once a threat UAV carrying a malicious payload has been captured, the operator of the threat UAS may still have the ability to release the payload being carried by the threat UAV. Thus, the threat UAV may still execute an attack on friendly forces/assets when the threat UAV is captured in a sensitive location.

Systems have also been developed that focus on blocking signals to/from a threat UAV. For example, U.S. Patent Publication No. 2017/0253348, which was also submitted by the United States Air Force and the contents of which is incorporated herein by reference, is directed to a system of arresting and neutralizing threat UAVs by trapping a threat UAV in a containment device designed to achieve radio frequency isolation of the threat UAV within the containment device. While this system is effective in blocking communications (e.g., video feed, flight control, malicious payload detonation, etc.) between the threat UAS and the threat UAV, it may sometimes be difficult to capture the threat UAV within the containment device, particularly given the weight limitations of the containment unit being carried by the friendly UAV during aerial pursuit of the threat UAV.

In view of the above and other considerations, there is a need for a system for effectively capturing a threat UAV (i.e., physical defeat of the threat UAV) and blocking signals to/from a threat UAS to the threat UAV upon capture (i.e., signal defeat of the threat UAV).

SUMMARY OF THE INVENTION

According to one embodiment of the disclosure, the above and other needs are met by a system for defeating a threat unmanned aerial vehicle that includes a friendly unmanned aerial vehicle and a containment system. The containment system is deployable from the friendly unmanned aerial vehicle and includes a signal blocking enclosure and a capturing device. The signal blocking enclosure is formed of a conductive material for shielding radio frequency signals from propagating in or out of the signal blocking enclosure. The capturing device is configured for arresting the threat unmanned aerial vehicle and positioning an arrested threat unmanned aerial vehicle within the signal blocking enclosure.

According to certain embodiments, the signal blocking enclosure is operable to be expanded from a compact position for enhanced flight of the friendly unmanned aerial vehicle to a signal blocking position such that the signal blocking enclosure is operable to shield radio frequency signals from propagating in or out of the signal blocking enclosure. In some embodiments, the signal blocking enclosure includes an upper end secured to the friendly unmanned vehicle and a lower end disposed adjacent the upper end in the compact position. According to this embodiment, the system further includes a release mechanism for releasing the lower end such that the lower end drops by gravity to expand the signal blocking enclosure from the compact position to the signal blocking position. In certain embodiments, the signal blocking enclosure further includes an auto-cinching mechanism operatively connected to the lower end of the signal blocking enclosure for closing the signal blocking enclosure as the signal blocking enclosure is expanded from the compact position to the signal blocking position.

According to certain embodiments, the containment system further comprises a suspension rod that is extendable from a compact position in which the suspension rod is disposed within a horizontal footprint of the signal blocking enclosure to an extended position in which one or more peripheral portions of the suspension rod extend beyond the horizontal footprint of the signal blocking enclosure. According to this embodiment, the capturing device includes an upper end secured to the suspension rod and a lower end operable to be disposed below a vertical footprint of the signal blocking enclosure for arresting the threat unmanned aerial vehicle. In some embodiments, the one or more peripheral portions of the suspension rod are load-limited such that the one or more peripheral portions break upon arrest of the threat unmanned aerial vehicle in the capturing device so that the suspension rod fits within the horizontal footprint of the signal blocking enclosure after extension to the extended position.

According to another embodiment of the disclosure, a system for defeating a threat unmanned aerial vehicle includes a friendly unmanned aerial vehicle and a containment system being deployable from the friendly unmanned aerial vehicle. The containment system includes a capturing device dimensioned and configured to be suspended from the friendly unmanned aerial vehicle for arresting the threat unmanned aerial vehicle and a signal blocking enclosure formed of a conductive material. The signal blocking enclosure is operable to be expanded from a compact position to a signal blocking position. In the compact position, the signal blocking enclosure is disposed adjacent a bottom surface of the friendly unmanned aerial vehicle. In the signal blocking position, the signal blocking enclosure is operable to enclose an arrested unmanned aerial vehicle for preventing communication to or from the arrested unmanned aerial vehicle from a threat unmanned aerial vehicle system.

According to certain embodiments, the containment system further comprises a suspension rod secured to the friendly unmanned aerial vehicle that is extendable from a compact position in which the suspension rod is disposed within a horizontal footprint of the signal blocking enclosure to an extended position in which one or more load-limited peripheral portions of the suspension rod extend beyond the horizontal footprint of the signal blocking enclosure. According to this embodiment, the capturing device includes an upper end secured to the suspension rod such that the one or more peripheral portions break upon arrest of the threat unmanned aerial vehicle in the capturing device so that the suspension rod fits within the horizontal footprint of the signal blocking enclosure after extension to the extended position. In some embodiments, the suspension rod is configured to be rotated to raise the capturing device for positioning the arrested unmanned aerial vehicle within a vertical footprint of the signal blocking enclosure.

According to certain embodiments, the capturing device further includes a winch system secured to the friendly unmanned aerial vehicle that is operable to raise the capturing device for positioning the arrested unmanned aerial vehicle within a vertical footprint of the signal blocking enclosure. In some embodiments, the signal blocking enclosure includes a release mechanism operable to expand the signal blocking enclosure from the compact position to the signal blocking position when the arrested unmanned aerial vehicle is within the vertical footprint of the signal blocking enclosure. In some embodiments, the signal blocking enclosure further includes an auto-cinching mechanism operatively connected to a lower end of the signal blocking enclosure for closing the lower end of the signal blocking enclosure as the signal blocking enclosure is expanded from the compact position to the signal blocking position.

According to another embodiment of the disclosure, a method for defeating a threat unmanned aerial vehicle includes flying a friendly unmanned aerial vehicle in a proximity of the threat unmanned aerial vehicle; arresting the threat unmanned aerial vehicle using a capturing device operatively suspended from the friendly unmanned aerial vehicle; positioning the arrested threat unmanned aerial vehicle within a footprint of a signal blocking enclosure operatively connected to the friendly unmanned aerial vehicle; and enclosing the arrested threat unmanned aerial vehicle within the signal blocking enclosure for preventing communication to or from the arrested unmanned aerial vehicle from a threat unmanned aerial vehicle system.

According to certain embodiments, the friendly unmanned aerial vehicle includes a suspension rod that is extendable from a compact position in which the suspension rod is disposed within a horizontal footprint of the signal blocking enclosure to an extended position in which one or more load-limited peripheral portions of the suspension rod extend beyond the horizontal footprint of the signal blocking enclosure. According to this embodiment, the capturing device includes an upper end secured to the suspension rod, the arresting step further includes extending the suspension rod to the extended position, and the positioning step further includes breaking the one or more load-limited peripheral portions of the suspension rod upon arrest of the threat unmanned aerial vehicle in the capturing device so that the suspension rod fits within the horizontal footprint of the signal blocking enclosure after extension to the extended position.

According to certain embodiments, the positioning step further includes raising the capturing device with respect to the friendly unmanned aerial vehicle after arresting the threat unmanned aerial for positioning the arrested unmanned aerial vehicle within a vertical footprint of the signal blocking enclosure. In some embodiments, the arresting step includes lowering the net with respect to the friendly unmanned aerial vehicle to an arresting position below the vertical footprint of the signal blocking enclosure prior to raising the capturing device for positioning within the vertical footprint of the signal blocking enclosure.

According to certain embodiments, the enclosing step includes expanding the signal blocking enclosure from a compact position to a signal blocking position when the arrested unmanned aerial vehicle is within a footprint of the signal blocking enclosure. In some embodiments, the flying step includes flying the friendly unmanned aerial vehicle with the signal blocking enclosure in the compact position. In some embodiments, the signal blocking enclosure includes an upper end secured to the friendly unmanned vehicle and a lower end disposed adjacent the upper end in the compact position and the enclosing step further includes releasing the lower end from the compact position such that the lower end drops by gravity to expand the signal blocking enclosure from the compact position to the signal blocking position. According to certain embodiments, an auto-cinching mechanism is operatively connected to the lower end of the signal blocking enclosure and the enclosing step further includes closing the signal blocking enclosure with the auto-cinching mechanism as the signal blocking enclosure is expanded from the compact position to the signal blocking position.

BRIEF DESCRIPTION OF THE DRAWINGS

Other embodiments of the disclosure will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Referring to FIGS. 1A-1D and FIGS. 2-3, a "friendly" UAS 12 for defeating a threat UAV 10 is depicted according to an exemplary embodiment of the disclosure. The friendly UAS 12 includes a friendly UAV 14 that is configured to be operated by a remote controller using wireless communication technologies as known in the art. According to this embodiment, the friendly UAV 14 is depicted as a commercially available DJI Phantom IV drone, which is a Group 1 UAV according to US DoD classifications. Another example of a preferred friendly UAV 14 according to the embodiments of the present disclosure is the commercially available DJI S1000. However, it should be understood that various types of UAVs with varying capabilities may be selected/utilized based on resources available and the capabilities needed in the friendly UAV 14 for a particular objective. In most embodiments, the capabilities needed for the friendly UAV 14 will largely depend on (1) the weight of the threat UAVs 10 being pursued; and (2) the weight of the containment system being carried by the friendly UAV 14 as described below. Advantages of using a Group 1-Group 2 UAV as the friendly UAV 14 include greater mobility for pursuing threat UAVs 10 having similar capabilities while also minimizing expenses.

Figure 1A:
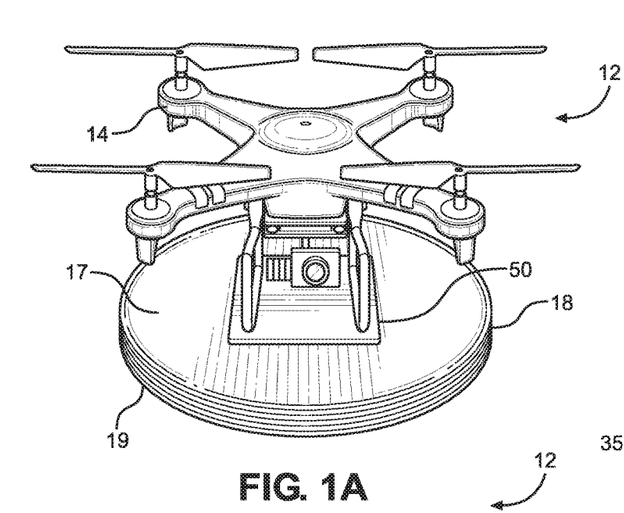
FIGS. 1A-1D depict a friendly UAS having a signal blocking enclosure in the compact position and a capturing device in the process of being deployed and used for arresting a threat UAV in the capturing device according to one embodiment of the disclosure.
Figure 1B:
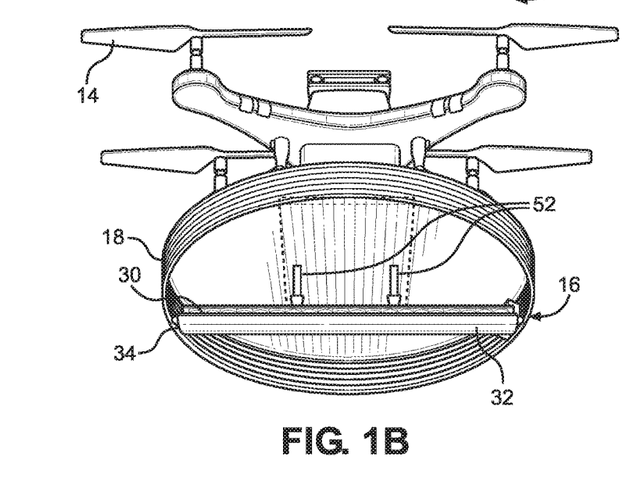
Figure 1C:
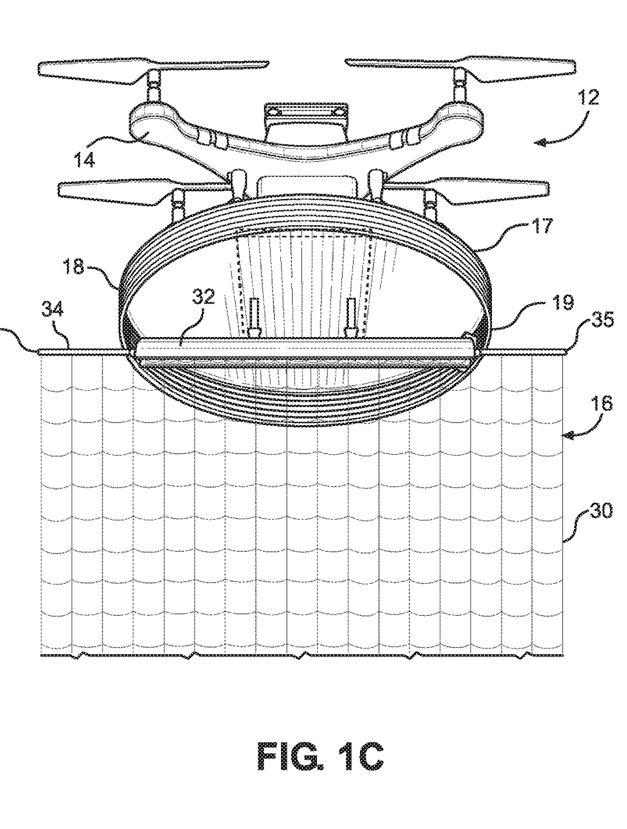
Figure 1D:
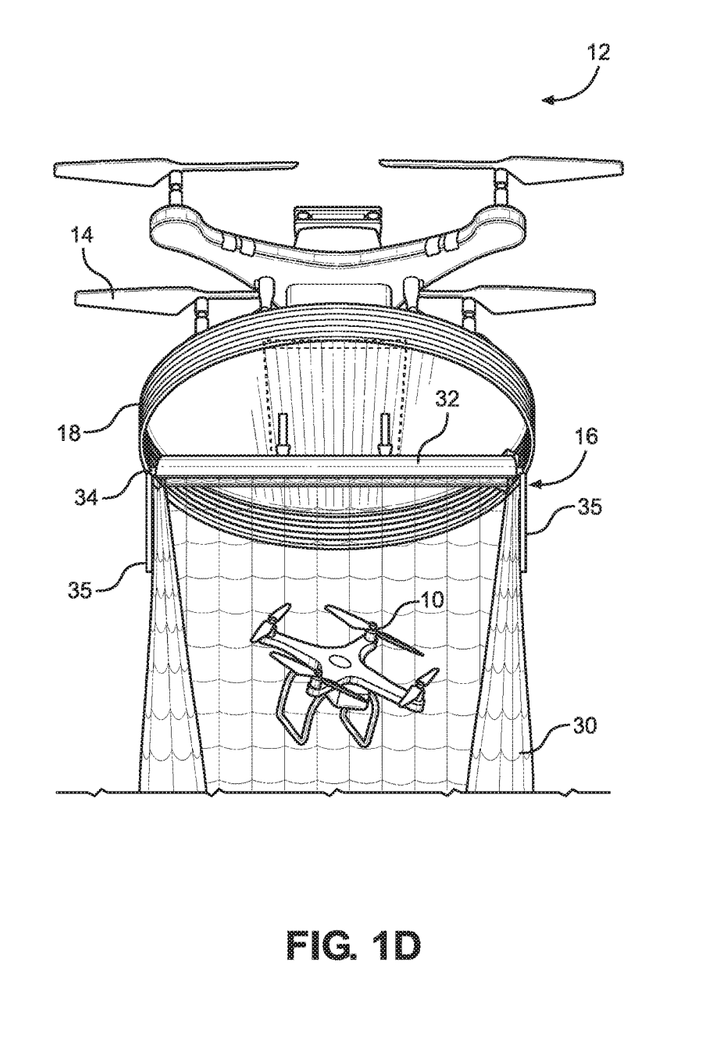
Figure 2:
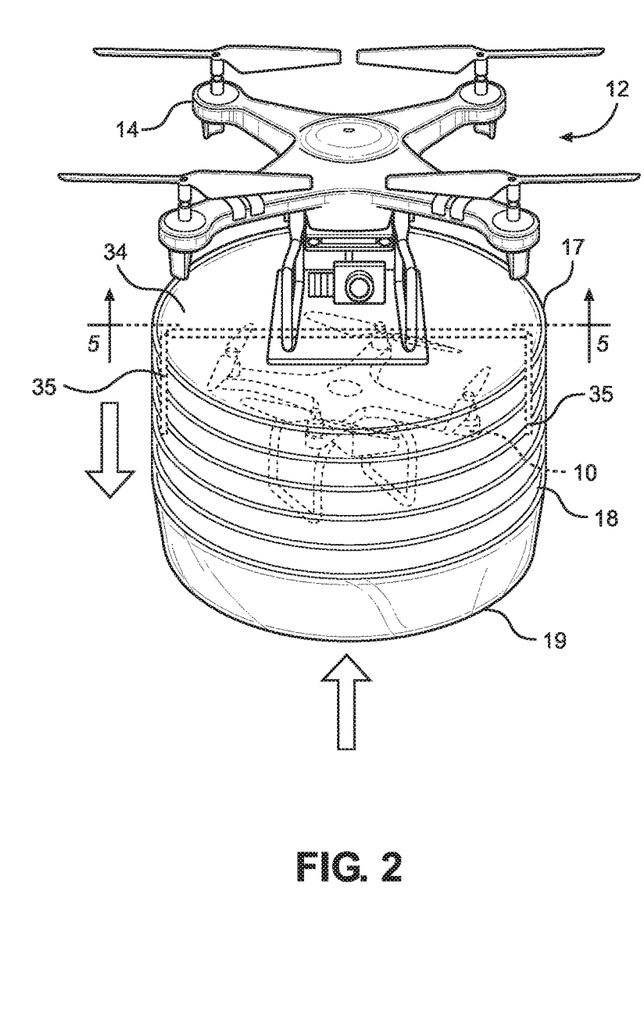
FIG. 2 depicts a friendly UAS having a signal blocking enclosure in the extended signal blocking position for enclosing a threat UAV after being arrested and raised to within the footprint of the signal blocking enclosure by the capturing device according to one embodiment of the disclosure.
Figure 3:
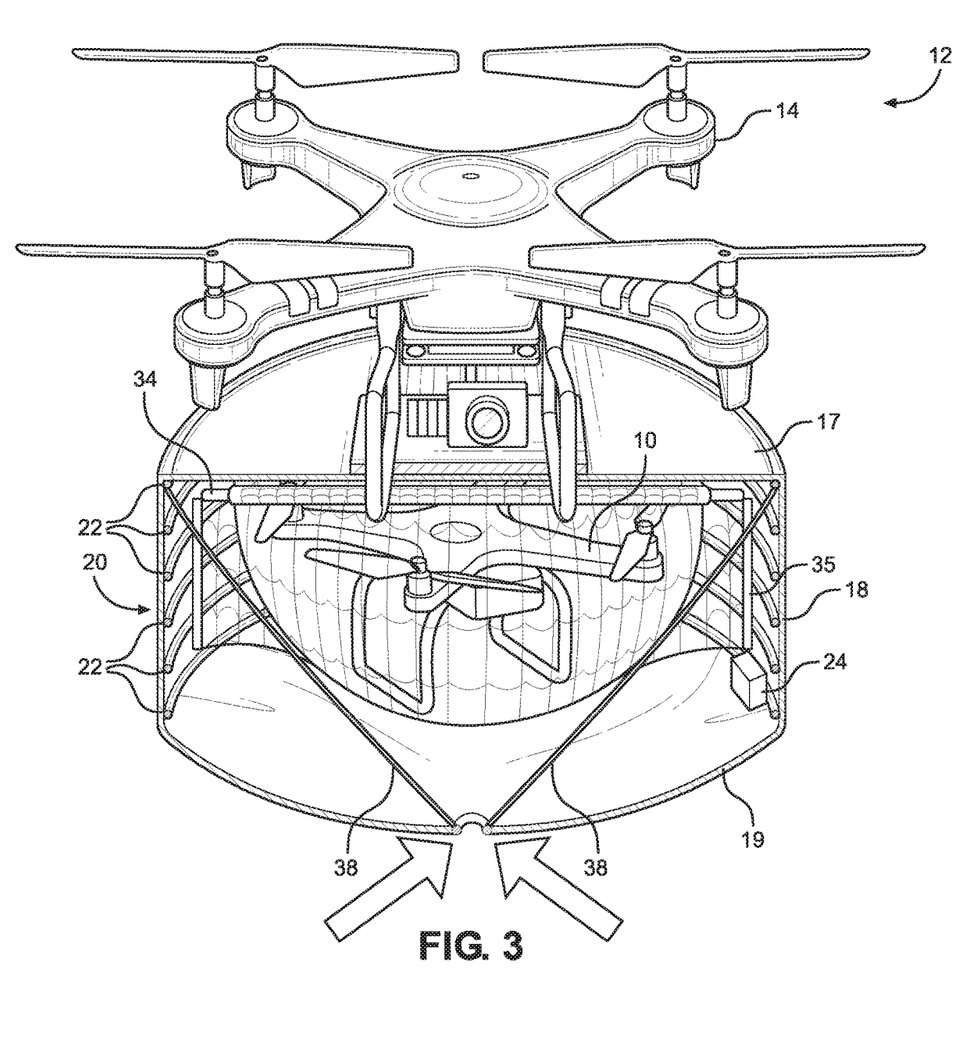
FIG. 3 depicts a cross-sectional view of the signal blocking enclosure of FIG. 2 having a suspension rod configured to rotate for raising the capturing device according to one embodiment of the disclosure.

According to the present disclosure, friendly UAV 14 is configured/modified to include a containment system 16 disposed below the friendly UAV 14 that includes a signal blocking enclosure 18 and, at least in preferred embodiments, a separate capturing device 30. The signal blocking enclosure 18 is preferably formed of a conductive material for shielding radio frequency signals from propagating in or out of an enclosed signal blocking enclosure 18. While the materials and construction of the signal blocking enclosure 18 may vary in accordance with various types of Faraday cages/shields as known in the art, the signal blocking closure 18 is preferably a formed of a lightweight conductive fabric having an upper end 17 and a lower end 19. In preferred embodiments, the upper end 17 is secured adjacent to the bottom of the friendly UAV 14 while the lower end 19 includes an opening in the fabric. In preferred embodiments, the fabric is configured to be expanded/dropped vertically from a compact storage/flight position (as depicted in FIGS. 1A-1D where both the upper end 17 and lower end 19 are disposed generally together adjacent to the bottom of the friendly UAV 14) to an extended signal blocking position (as depicted in FIGS. 2-3 where the distance between the upper end 17 and the lower end 19 has been expanded to enclose a threat UAV 10). For purposes of the present disclosure, the area below the signal blocking enclosure 18 in the compact position that is able to be enclosed by the sides of the signal blocking enclosure 18 in the extended position is referred to as the "footprint" of the signal blocking enclosure 18. It should also be understood that the "footprint" of the signal blocking enclosure 18 includes (1) a "vertical footprint" that encompasses the vertical distance between the upper end 17 and lower end 19 of the signal blocking enclosure 18 in the signal blocking position; and (2) a "horizontal footprint" that encompasses the horizontal distance between respective sides of the signal blocking enclosure 18, which is typically the same regardless of whether the signal blocking enclosure is in the compact position or the extended position.

To expand the signal blocking enclosure 18 while maintaining a desired shape/width of the signal blocking enclosure 18 in the extended position, the signal blocking enclosure 18 will preferably include a volume-enhancing mechanism 20 secured along the length of the signal blocking enclosure 18. For example, the volume-enhancing mechanism 20 could include a plurality of rings 22 secured along the interior length of the signal blocking enclosure 18 as depicted best in the cross-sectional view of the signal blocking enclosure 18 in FIG. 3. Thus, when the rings 22 are closely coupled as exemplified in FIGS. 1A-1D, the signal blocking enclosure 18 is in a compact position underneath the friendly UAV 14. As should be understood, the compact position of the signal blocking enclosure 18 enables enhanced flight (e.g., less drag) of the friendly UAV 14 during pursuit of a threat UAV 10. On the other hand, when the rings 22 are released from their closely coupled position of FIGS. 1A-1D, the signal blocking enclosure 18 extends to its signal blocking position having an enhanced volume for enclosing a threat UAV 10 as depicted in FIGS. 2-3 (it is noted that the capturing device 30, as well as the housing portion 32 described below, has been omitted from FIG. 2 for simplicity in viewing the other components).

It should be understood that the volume-enhancing mechanism 20 may take various forms within the concepts of the present disclosure. For example, instead of a plurality of individual rings 22 as depicted, the rings 22 could be in a continuous helix form (i.e., a "slinky" type system). Other forms of the volume-enhancing mechanism 20 for the signal blocking enclosure include, but are not limited to, bellowed/corrugated type walls that are able to expand and contract, telescoping rods, inflatable walls, etc. Further, the mechanism to control the volume-enhancing mechanism 20 as it moves the signal blocking enclosure 18 between the compact and extended position may vary. In certain embodiments, the volume-enhancing mechanism 20 moves from the compact position to the extended position by the force of gravity. For example, according to the embodiment described above in which the volume-enhancing mechanism 20 is a plurality of rings 22 stacked on top of each other, a release mechanism 24 (as depicted best in FIG. 3) could be disposed adjacent the bottom ring 22 for holding the above rings in the compact position. Actuating the release mechanism 24 would then result in the signal blocking enclosure 18 dropping under the force of gravity from the compact position to the extended position by releasing the rings 22 above the bottom ring. According to certain embodiments, the release mechanism 24 is operatively connected to an actuator that is controlled by a remote controller. In alternate embodiments, actuator may be configured to actuate the release mechanism 24 upon a threat UAV 10 being raised up into the footprint of the signal blocking enclosure 18 by the capturing device 30. To move the signal blocking enclosure 18 from the extended position back to the compact position (such as after a threat UAV 10 has been defeated), a user could manually couple the rings 22 back together and position the release mechanism 24 to the unactuated position.

To vertically expand the footprint of the containment system 16 beyond the footprint of the signal blocking enclosure 18, the containment system 16 may also include a separate capturing device 30 that is configured to be suspended from the friendly UAV 14. The capturing device 30 is preferably in the form of a net for rapidly entangling the rotor blades of the threat UAV 10. However, it should be understood that the capturing device 30 may take other forms such as individual strings, streamers, a light weight sheet, tarp, etc. so long as the capturing device 30 is able to be suspended from the friendly UAV 14 during flight of the UAV. When the capturing device 30 is in the suspended position as shown in FIG. 1C, the capturing device 30 is considered to be deployed in a manner in which the capturing device 30 includes a larger footprint than the signal blocking enclosure 18. To capture a threat UAV 10, the friendly UAV 14 with a deployed capturing device 30 is then flown in the proximity of the threat UAV 10 such that the threat UAV 10 gets caught in the capturing device 18 as shown in FIG. 1D. Advantageously, friendly UAV 14 with suspended capturing device 30 does not require the friendly UAV 14 to include any launch-based systems such as explosive charges, compressed air, or other ammunition type charges to deploy the capturing device 30. Further, the capturing device 30 can be continually utilized until a threat UAV 10 is caught in the capturing device 30 (as compared to launch systems where misses of the capturing device would require a new capturing device to be loaded into the launching system).

In certain embodiments, the friendly UAV 14 is configured to always fly with the capturing device 30 deployed. In other embodiments, the capturing device 30 is deployed when desired so as to not interfere with the flight of the friendly UAV 14 during its pursuit of a threat UAV 10. Thus, according to certain embodiments, the containment system 16 may including an expanding system for the capturing device 30 that includes a housing portion 32 configured to move from a housing configuration (FIG. 1B) for housing the capturing device 30 during flight to a releasing configuration (FIGS. 1C-1D) for expanding the capturing device vertically when desired to capture a threat UAV 10. The housing portion 32 according to one exemplary embodiment is a hollow-tube shape that extends generally along the width of the signal blocking enclosure 18. With reference to FIG. 1B, the housing portion 32 includes an open top such that the capturing device 30 is able to be dropped or otherwise inserted into the housing portion 32 through the open top. With reference to FIG. 1C, a controller is able to rotate the housing portion 32 such that the open top becomes an open bottom to release/drop the capturing device 30 towards the ground when desired to capture a threat UAV 10.

In certain embodiments, and with particular reference to FIG. 1C, the expanding system for the capturing device 30 may further include a suspension rod 34 secured to a bottom surface of the friendly UAV 14. In certain embodiments, the suspension rod 34 is part of the housing portion 32 while, in other embodiments, the suspension rod 34 is disposed adjacent to the housing portion 32. In certain embodiments, the suspension rod 34 is extendable from a compact storage/flight position (FIG. 1B) to an extended capturing position (FIG. 1C). The capturing device 30 is then suspended from the friendly UAV 14 via the suspension rod 34 (with the capturing device positioned 30 in the housing portion 32 when in the undeployed position). While the suspension rod 34 may take many forms, suspension rod 34 is preferably formed of a plurality of telescoping carbon-fiber composite rods to provide a lightweight suspension rod 34 with sufficient strength to support a threat UAV 10 caught in the capturing device 30.

Referring to FIG. 1B, the suspension rod 34 is preferably disposed generally within the horizontal footprint of the signal blocking enclosure 18 when the suspension rod 34 is in the compact position. On the other hand, and with reference to FIG. 1C, the suspension rod 34 is configured to extend horizontally out of the footprint of the signal blocking enclosure 18 when the suspension rod 34 is in the extended position. In other words, when the suspension rod 34 is in the extended capturing position with the capturing device 30 deployed from the suspension rod 34, the footprint of the containment system 16 is able to be expanded both horizontally and vertically with respect to the footprint of the signal blocking enclosure 18.

In certain embodiments, the friendly UAS 12 may be configured to extend suspension rod 34 from the compact position to the extended position during flight by controller. For example, the suspension rod 34 may include two or more telescoping segments controlled by an actuator that is able to be remotely controlled by controller. The outer segments 35 may then be spring loaded to the compact position such that activation of the actuator by controller causes the suspension rod 34 to be automatically expanded to the extended capturing position. In other embodiments, the suspension rod 34 may be manually extendable pre-flight to reduce the complexity of the friendly UAS 12. According to either embodiment, the extended capturing position of the suspension rod 34 may be configured to include a plurality of positions/segments that allows for varying lengths/footprints of the capturing device 30 in the deployed position.

According to embodiments in which the capturing device 30 is able to be expanded horizontally beyond the footprint of the signal blocking enclosure 18 via suspension rod 34, the suspension rod 34 is further configured to be reduced in length to a condensed position such that the suspension rod 34 no longer extends horizontally beyond the horizontal footprint of the signal blocking enclosure. Thus, once in the condensed position, the suspension rod 34 will not interfere with the signal blocking enclosure 18 being released to the extended position.

In preferred embodiments, at least the outer periphery of suspension rod 34 is load-limited such that the weight of a threat UAV 10 captured in the capturing device is operable to reduce the length of suspension rod 34 to the condensed position. For example, in certain embodiments and as shown in FIG. 1D and FIG. 2, at least the outer segments 35 of suspension rod 34 may be configured to bend or break down under the weight of a threat UAV 10 captured in the capturing device 30, which results in a suspension rod 34 with a reduced length. To form the breakable outer segments 35, the outer segments 35 may be attached to the central portion of the suspension rod 34 using any number of load-limited release mechanisms such as hinges, adhesive, magnets, friction clips, Velcro, etc. For purposes of the present disclosure, the term "break" or "breaking" with respect to the peripheral portions or outer segments 35 of suspension rod refers to any bending, breaking, hinging, etc. of the peripheral portions or outer segments 35 in a manner that reduces the length of the suspension rod 34 such that the rod 34 is intended to fit within the horizontal footprint of the signal blocking enclosure 18 after previously having been extended beyond the horizontal footprint.

According to certain embodiments, the outer segments 35 of suspension rod 34 may be configured such that both the weight of the signal blocking enclosure 18 being released and the weight of the threat UAV 10 is operable to break the outer segments 35 of suspension rod 34. According to other embodiments, the outer segments 35 of suspension rod may also be configured to break based on the weight of the threat UAV 10 that is captured in the capturing device 30 and a sharp movement (e.g., upward thrust) of the friendly UAV 14. More specifically, the connection force of the load limited release mechanisms connecting the outer segments 35 to an inner segment of suspension rod 34 can vary along a scale that includes a connection force that is greater than a spacing-proportioned weight of the capturing device 30 at its lower limit and a connection force that is substantially equal to or a little less than a spacing-proportioned weight of the expected threat UAV 10 at its upper limit. In embodiments in which it is intended to further require a sharp movement of the friendly UAV 14 and/or the weight of the signal blocking enclosure 18 to break outer segments 35, the connection force should be closer to the spacing-proportioned weight of the expected threat UAV 10 (i.e., near the upper limit on the scale described above). On the other hand, for embodiments in which it is intended for the outer segments 35 to be immediately broken upon capture of a threat UAV 10 without necessarily requiring a sharp movement by the friendly UAV 14 and/or the weight of the signal blocking enclosure 18, the connection force should be less than the spacing-proportioned weight of the expected threat UAV 10 (i.e., more significantly below the upper limit on the scale described above).

In addition to reducing the length of suspension rod 34 such that it can fit within the horizontal footprint of the signal blocking enclosure 18, providing outer segments 35 that are intended to break, bend, hinge down, etc. along the periphery of the suspension rod 34 allows a threat UAV 10 captured in the peripheral portion of the capturing device 30 to be repositioned to the central portion of the capturing device 30. Once repositioned to the central portion of the capturing device 30, the threat UAV 10 is better positioned to be raised raise by a lifting device as described below to within the vertical footprint of the signal blocking enclosure 18 and/or better positioned with respect to the friendly UAV 14 to transport the threat UAV 10 to a remote/safe location prior to releasing the signal blocking enclosure 18.

Figure 4:
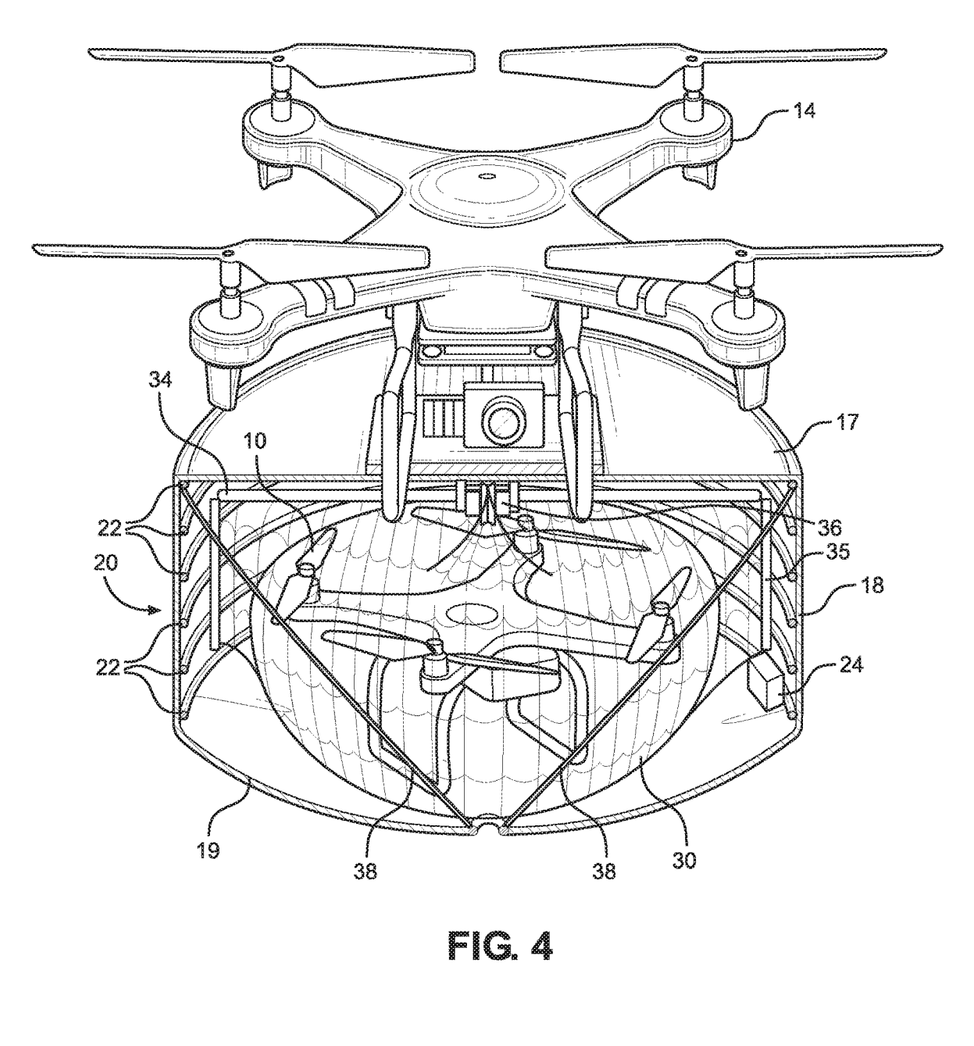
FIG. 4 depicts a cross-sectional view of the signal blocking enclosure of FIG. 2 having a winch system for raising the capturing device according to another embodiment of the disclosure.

Referring to FIG. 3 (with the housing portion 32 omitted for simplicity in viewing the suspension rod 34), the suspension rod of this embodiment may be configured to be rotated to raise the capturing device 30 to within the vertical footprint of the signal blocking enclosure 18. In other words, the suspension rod 34 is itself the lifting device. Referring to FIG. 4, the capturing device 30 may alternately be attached/tethered to a separate lifting device 36 (e.g., a winch type system) for raising the capturing device 30 after a threat UAV 10 has been caught in capturing device 30. Once the threat UAV 10 is raised to within the horizontal and vertical footprint of the signal blocking enclosure 18 as a result of the particular lifting device raising the capturing device 30, the signal blocking enclosure 18 may be expanded as described above to enclose the captured threat UAV 10 and shield any radio frequency signals from being received or transmitted by the threat UAV 10 through the signal blocking enclosure 18.

According to another aspect of the disclosure and with reference to FIGS. 3-4, the signal blocking enclosure 18 preferably includes a cinching mechanism 38 operatively connected to the open lower end 19 of the signal blocking enclosure 18. The cinching mechanism 38 is configured to close the open lower end 19 when the signal blocking enclosure 18 is expanded from the compact position to the extended signal blocking position to enhance the signal blocking capabilities of the signal blocking enclosure 18. While the cinching mechanism 38 may take many forms including a closing mechanism that is remotely controlled by controller, the cinching mechanism 38 is preferably automated based on the release of the volume enhancing mechanism 20 and resulting movement of the lower end 19 of the signal blocking enclosure 18 dropping to the extended position under the weight of gravity. In other words, the signal blocking enclosure 18 preferably includes an auto-cinching mechanism 38 for closing the open lower end 19 as the signal blocking enclosure 18 is expanded from the compact position to the expanded position. For example, as shown in FIGS. 3-4, the auto-cinching mechanism 38 may be in the form of one or more drawstrings connected on one end to the lower end 19 of the signal blocking enclosure 18 and on the other end to one of the upper rings 22 of the volume-enhancing mechanism 20. The drawstring 38 is then dimensioned and configured such that the release of the volume-enhancing mechanism 20 auto-cinches the open lower end 19 of the signal blocking enclosure (e.g., the drawstring is configured to be a little shorter than the distance between the upper ring 22 to which the drawstring is attached and the intended vertical footprint of the signal blocking enclosure 18). Similarly, drawstring 38 could be attached to a weight that is also released when the volume enhancing mechanism is released. The drawstring 38 would then be dimensioned and configured to auto-cinch the opening as a result of the weight falling below the signal blocking enclosure. According to another potential embodiment, the auto-cinching mechanism 26 includes a plurality of magnets positioned around the open lower end 19 such that the magnets are configured to couple to each other only when the signal blocking enclosure 18 is released to the extended position. In yet another embodiment, one or more of the lower rings could have a bimodal shape. For example, when raised/held in the compact position with the other rings, the shape conforms to the shape of the other rings. However, when released from the compact position, springs other biasing mechanisms are able to push the lower rings to a cinched/clapped type position.

In certain embodiments, the containment system 16 may further include an adapter plate 50 (with reference to FIG. 1A) for connecting the containment system 16 to the friendly UAV 14. In preferred embodiments, the adapter plate 50 is configured to be remotely released from the friendly UAV 14 by a controller. For example, friendly UAV 14 may be initially used to capture and/or transport an arrested threat UAV 10 from a sensitive location to a remote location while utilizing signal blocking enclosure 18 as described above. Once at the remote location, the adapter plate 50 may be released from the friendly UAV 14 by remote controller such that the threat UAV 10 is dropped to the ground at the remote location. In other embodiments, the adapter plate 50 may be configured to be releasable (whether automatically by weight or using controller) such that the entirety of the containment system 16 is released from the friendly UAV 14 if subjected to too much weight. For example, friendly UAV 14 may be intended to transport an arrested threat UAV 10 as described above. However, if the captured threat UAV 10 ends up being too heavy, adapter plate 50 is configured to be weight releasable based on the maximum load able to be carried by the friendly UAV 14 to avoid damage or destruction of the friendly UAV 14.

According to other embodiments of the disclosure, only the capturing device 30 (including its expanding system components such as housing portion 32 and suspension rod 34) may be removably suspended to adapter plate 50 via adapters 52 (see FIG. 1B). In certain embodiments, the entirety of the capturing device 30 may be configured to be weight releasable to adapter plate 50 to prevent damage or destruction to the friendly UAV 14 if the threat UAV 10 captured by the capturing device 30 is too heavy. Further, according to some embodiments, a plurality of capturing devices 30 may be removably connected to adapter plate 50 using multiple sets of adapters 52 in the form of a plurality of individual assemblies each containing a capturing device 30 as described above. Thus, according to this embodiment, one operation could include loading a plurality of capturing devices to the friendly UAV 14 by inserting individual adapters 52 into a series of corresponding receivers disposed in adapter plate 50. The friendly UAV 14 then begins its pursuit of a threat UAV 10. When the friendly UAV 14 is in the proximity of a threat UAV 10, the capturing device 30 of one of the adapter sets 52 is deployed. Upon capture, the capturing device 30 is raised into the signal blocking enclosure 18 substantially as described above. Once the threat UAV is removed to a remote location, the capturing device 30 is released from the adapter plate 50 through the lower end 19 of the signal blocking enclosure 18. According to this embodiment, the open lower end 19 is either not closed when the signal blocking enclosure 18 is released to the expanded position or is configured to be able to be remotely closed during flight. Once the captured threat UAV 10 is released from the friendly UAV 14 in the desired location, the friendly UAV 14 may again be flown in the proximity of another threat UAV 10 to be captured by another one of the capturing devices 30 loaded to adapter plate 50. This process can be repeated as many times as needed depending on the number of capturing devices 30 connected to the friendly UAV 14.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for defeating a threat unmanned aerial vehicle, the system comprising:
 a friendly unmanned aerial vehicle; and
 a containment system being deployable from the friendly unmanned aerial vehicle, the containment system including:
  a signal blocking enclosure formed of a conductive material for shielding radio frequency signals from propagating in or out of the signal blocking enclosure, and
  a capturing device for arresting the threat unmanned aerial vehicle and positioning an arrested threat unmanned aerial vehicle within the signal blocking enclosure,
 wherein the signal blocking enclosure is operable to be expanded from a compact position for enhanced flight of the friendly unmanned aerial vehicle to a signal blocking position such that the signal blocking enclosure is operable to shield radio frequency signals from propagating in or out of the signal blocking enclosure, wherein the containment system further comprises a suspension rod that is extendable from a compact position in which the suspension rod is disposed within a horizontal footprint of the signal blocking enclosure to an extended position in which one or more peripheral portions of the suspension rod extend beyond the horizontal footprint of the signal blocking enclosure, the capturing device including an upper end secured to the suspension rod and a lower end operable to be disposed below a vertical footprint of the signal blocking enclosure for arresting the threat unmanned aerial vehicle.

2. The system of claim 1 wherein the signal blocking enclosure includes an upper end secured to the friendly unmanned vehicle and a lower end disposed adjacent the upper end in the compact position, the system further comprising a release mechanism for releasing the lower end such that the lower end drops by gravity to expand the signal blocking enclosure from the compact position to the signal blocking position.

3. The system of claim 2 further comprising an auto-cinching mechanism operatively connected to the lower end of the signal blocking enclosure for closing the signal blocking enclosure as the signal blocking enclosure is expanded from the compact position to the signal blocking position.

4. The system of claim 1 wherein the one or more peripheral portions of the suspension rod are load-limited such that the one or more peripheral portions break upon arrest of the threat unmanned aerial vehicle in the capturing device so that the suspension rod fits within the horizontal footprint of the signal blocking enclosure after extension to the extended position.

5. A system for defeating a threat unmanned aerial vehicle, the system comprising:
a friendly unmanned aerial vehicle; and
a containment system being deployable from the friendly unmanned aerial vehicle, the containment system including:
a capturing device dimensioned and configured to be suspended from the friendly unmanned aerial vehicle for arresting the threat unmanned aerial vehicle, and
a signal blocking enclosure formed of a conductive material, the signal blocking enclosure being operable to be expanded from a compact position to a signal blocking position, the signal blocking enclosure being disposed adjacent a bottom surface of the friendly unmanned aerial vehicle in the compact position, and the signal blocking enclosure being operable to enclose an arrested unmanned aerial vehicle for preventing communication to or from the arrested unmanned aerial vehicle from a threat unmanned aerial vehicle system in the signal blocking position,
wherein the containment system further comprises a suspension rod secured to the friendly unmanned aerial vehicle that is extendable from a compact position in which the suspension rod is disposed within a horizontal footprint of the signal blocking enclosure to an extended position in which one or more load-limited peripheral portions of the suspension rod extend beyond the horizontal footprint of the signal blocking enclosure, the capturing device including an upper end secured to the suspension rod such that the one or more peripheral portions break upon arrest of the threat unmanned aerial vehicle in the capturing device so that the suspension rod fits within the horizontal footprint of the signal blocking enclosure after extension to the extended position.

6. The system of claim 5 wherein the suspension rod is configured to be rotated to raise the capturing device for positioning the arrested unmanned aerial vehicle within a vertical footprint of the signal blocking enclosure.

7. The system of claim 5 wherein the capturing device further includes a winch system secured to the friendly unmanned aerial vehicle, the winch system operable to raise the capturing device for positioning the arrested unmanned aerial vehicle within a vertical footprint of the signal blocking enclosure.

8. The system of claim 7 wherein the signal blocking enclosure includes a release mechanism operable to expand the signal blocking enclosure from the compact position to the signal blocking position when the arrested unmanned aerial vehicle is within the vertical footprint of the signal blocking enclosure.

9. The system of claim 8 further comprising an auto-cinching mechanism operatively connected to a lower end of the signal blocking enclosure for closing the lower end of the signal blocking enclosure as the signal blocking enclosure is expanded from the compact position to the signal blocking position.

10. A method for defeating a threat unmanned aerial vehicle, the method comprising:
flying a friendly unmanned aerial vehicle in a proximity of the threat unmanned aerial vehicle;
arresting the threat unmanned aerial vehicle using a capturing device operatively suspended from the friendly unmanned aerial vehicle;
positioning the arrested threat unmanned aerial vehicle within a footprint of a signal blocking enclosure operatively connected to the friendly unmanned aerial vehicle; and
enclosing the arrested threat unmanned aerial vehicle within the signal blocking enclosure for preventing communication to or from the arrested unmanned aerial vehicle from a threat unmanned aerial vehicle system, wherein the friendly unmanned aerial vehicle includes a suspension rod that is extendable from a compact position in which the suspension rod is disposed within a horizontal footprint of the signal blocking enclosure to an extended position in which one or more load-limited peripheral portions of the suspension rod extend beyond the horizontal footprint of the signal blocking enclosure, the capturing device including an upper end secured to the suspension rod, the arresting step further includes extending the suspension rod to the extended position, and the positioning step further includes breaking the one or more load-limited peripheral portions of the suspension rod upon arrest of the threat unmanned aerial vehicle in the capturing device so that the suspension rod fits within the horizontal footprint of the signal blocking enclosure after extension to the extended position.

11. The method of claim 10 wherein the positioning step further includes raising the capturing device with respect to the friendly unmanned aerial vehicle after arresting the threat unmanned aerial for positioning the arrested unmanned aerial vehicle within a vertical footprint of the signal blocking enclosure.

12. The method of claim 11 wherein the arresting step includes lowering the net with respect to the friendly unmanned aerial vehicle to an arresting position below the vertical footprint of the signal blocking enclosure.

13. The method of claim 10 wherein the enclosing step includes expanding the signal blocking enclosure from a compact position to a signal blocking position when the arrested unmanned aerial vehicle is within a footprint of the signal blocking enclosure.

14. The method of claim 13 wherein the flying step includes flying the friendly unmanned aerial vehicle with the signal blocking enclosure in the compact position.

15. The method of claim 13 wherein the signal blocking enclosure includes an upper end secured to the friendly unmanned vehicle and a lower end disposed adjacent the upper end in the compact position, the enclosing step further including releasing the lower end from the compact position such that the lower end drops by gravity to expand the signal blocking enclosure from the compact position to the signal blocking position.

16. The method of claim 15 wherein the signal blocking enclosure further includes an auto-cinching mechanism operatively connected to the lower end of the signal blocking enclosure, the enclosing step further including closing the signal blocking enclosure with the auto-cinching mechanism as the signal blocking enclosure is expanded from the compact position to the signal blocking position.

* * * * *